Figure 1:
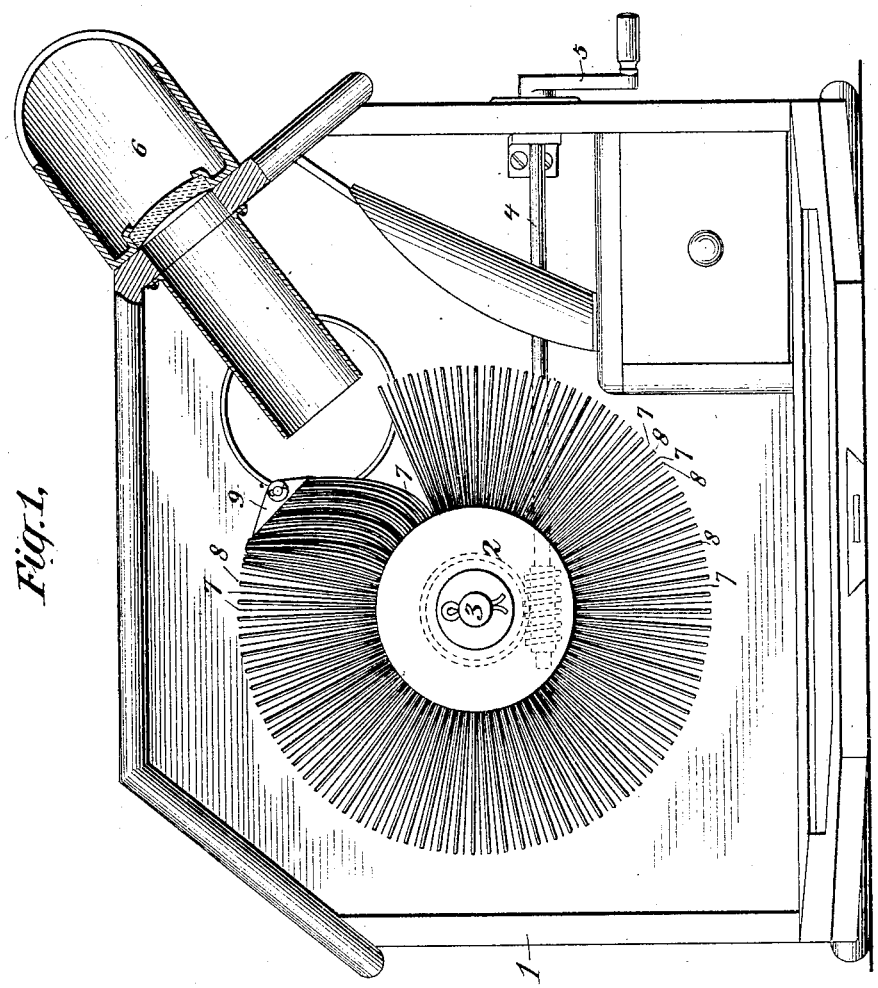

(No Model.) 2 Sheets—Sheet 1.

H. CASLER.
CONSECUTIVE VIEW APPARATUS.

No. 597,759. Patented Jan. 25, 1898.

WITNESSES:

INVENTOR

BY

ATTORNEYS (No Model.) 2 Sheets—Sheet 2.
H. CASLER.
CONSECUTIVE VIEW APPARATUS.
No. 597,759. Patented Jan. 25, 1898.
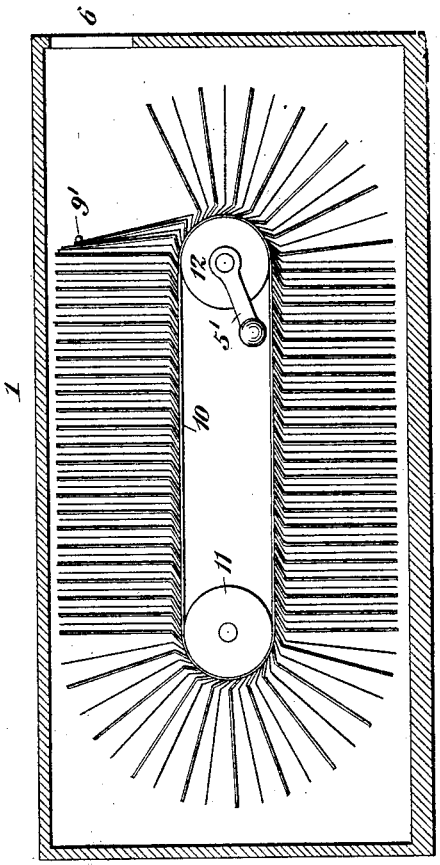
WITNESSES:
INVENTOR
BY
ATTORNEYS

UNITED STATES PATENT OFFICE.

HERMAN CASLER, OF CANASTOTA, NEW YORK.

CONSECUTIVE-VIEW APPARATUS.

SPECIFICATION forming part of Letters Patent No. 597,759, dated January 25, 1898.

Application filed May 28, 1897. Serial No. 638,522. (No model.)

*To all whom it may concern:*

Be it known that I, HERMAN CASLER, a citizen of the United States, residing at Canastota, in the county of Madison and State of New York, have invented certain new and useful Improvements in Consecutive-View Apparatus; and I do hereby declare the following to be a full, clear, and exact description of the invention, such as will enable others skilled in the art to which it appertains to make and use the same.

My invention relates generally to improvements in consecutive-view apparatus, and particularly to improvements in mutoscopes or picture-exhibiting instruments designed to reproduce to an observer the motions of objects by passing before his eyes in rapid succession a consecutive series of views of such objects; and my invention is an improvement upon the mutoscope illustrated and described in Letters Patent of the United States No. 549,309, issued to me on November 5, 1895. In the mutoscope of that patent the pictures are carried by a series of resilient cards mounted radially upon a revolubly-mounted spool or reel, which is rotated by means of suitable gearing. A detent, located near the place from which the pictures are to be observed, engages the edges of the cards as the spool rotates and retards them, holding the cards stationary, successively, in the field of view until by the movement of the spool each card is caused to bend sufficiently to slip under the detent, when its resiliency causes it to spring forward, passing so rapidly across the field of view that it does not perceptibly interrupt the vision and exposing to view the picture on the next succeeding card. I have found that the resiliency of the picture-cards themselves is not always sufficient to move them across the field of view as rapidly as is desirable. This is the case particularly where the picture-cards are of considerable size and are formed of comparatively thin paper. In such cases, therefore, it is desirable to provide means for accelerating the movement of the picture-cards when passing across the field of view.

The object of my invention, therefore, is to provide a cheap, simple, and effective device for accelerating the movement of the picture-cards while moving across the field of view and causing them to move more rapidly than they would be moved by their own unaided resiliency. This object I attain by interspersing between the picture-cards other cards or plates of high resiliency which, when released by the detent, move with the desired speed across the field of view and in so doing carry the picture-cards with them.

My invention consists in the use of such auxiliary cards or plates of higher resiliency than the picture-cards and in the combination of the picture-cards and carrier and connected mechanism therewith.

Figure 2:
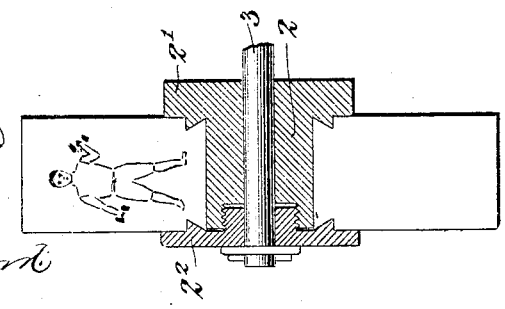

In the drawings, in which the same reference-numerals indicate the same or corresponding parts, Figure 1 is a side elevation of the mechanism of a mutoscope in which the cards are mounted upon a spool or reel, the side of the inclosing case having been removed. Fig. 2 is a longitudinal section of the spool or reel with the cards thereon; and Fig. 3 shows the invention applied to a mutoscope in which the cards are mounted upon an endless band or belt, the inclosing case having been sectioned.

Referring first to Figs. 1 and 2, 1 is the inclosing case of the mutoscope. 2 is the spool or reel carrying the cards and is mounted upon a shaft 3, having suitable bearings in the case 1 and revolved by means of a shaft 4 and crank 5 and connecting-gearing. 6 is the observation-opening.

Upon the reel 2 are two series of cards 7 7 and 8 8. 7 are the picture-cards, and 8 the auxiliary cards of high resiliency, above mentioned, which alternate with the picture-cards. The picture-cards may be any cards suitable for having pictures imprinted or otherwise placed upon their faces, and the auxiliary cards may be composed of a fine quality of bristol-board, or of the stock from which playing-cards are made, or may be composed of some other highly-resilient material, such as thin metal or celluloid. In the drawings the auxiliary cards are indicated by lines which are heavier than the lines which indicate the picture-cards, thus apparently indicating that the auxiliary cards are thicker than the picture-cards. This will naturally be the case when the auxiliary cards are composed of paper; but if made of metal they may be thinner than the picture-cards.

9 is the detent which holds back the various cards momentarily and so causes them to spring forward across the field of view with great rapidity when they slip under the detent. It is so placed that each card in order to pass from under it must first be bent considerably, so that just before the card is released it is under high tension.

The cards may be held in place upon the reel in any convenient or suitable manner. In Fig. 2 I have indicated one way of holding the cards in place. The reel is composed of two parts $2'$ and $2^2$, which are connected by screw-threads and are provided with projections or tenons engaging notches in the picture-cards. The two parts of the reel may be secured together, so as to hold these cards very firmly.

In Fig. 3 the cards are shown mounted upon an endless belt or band 10 instead of upon a reel. This belt passes around pulleys 11 and 12, and a crank $5'$ is provided to rotate one of these pulleys, so driving the belt. A suitable detent $9'$ is also provided near the observation-opening 6. The cards may be fastened to the belt in any convenient manner.

I do not limit my invention to any particular type of mutoscope. The auxiliary cards of high resiliency may be employed in any consecutive-view apparatus which depends for its operation upon the resiliency of a series of cards.

The operation of the auxiliary cards is the same in whatever form of apparatus they are employed. As the carrier for the cards is operated the picture-cards and auxiliary cards are successively moved under the detent and when they have been bent sufficiently escape from under the detent and spring forward across the field of view. Since each picture-card and its corresponding auxiliary card are held in close contact by the detent, they will spring forward at substantially the same time, the resiliency card carrying the picture-card rapidly across the field of view.

Having thus completely described my invention, what I claim, and desire to secure by Letters Patent, is—

1. In a consecutive-view apparatus, the combination, with a movably-mounted carrier having attached thereto a series of cards projecting therefrom and adapted to carry views, and means for operating the carrier, of a series of auxiliary cards or plates interspersed between said picture-carrying cards and adapted to impart resiliency thereto, and means for momentarily retarding and bending backward the cards of said carrier, successively, as the carrier moves, substantially as described.

2. In a consecutive-view apparatus, the combination, with a carrier having a series of cards mounted thereon adapted to carry views, and a series of auxiliary cards or plates interspersed between said view-carrying cards and adapted to impart resiliency thereto, each card being free at one end and rigidly secured to the carrier at the other end, of means for operating said carrier, and means for momentarily retarding and bending backward said cards, substantially as described.

3. In a mutoscope, the combination, with a reel, of a series of picture-cards arranged radially thereon, and a series of auxiliary cards or plates interspersed between said picture-cards and adapted to impart resiliency thereto, substantially as described.

4. In a mutoscope, the combination, with a reel having a series of picture-cards arranged radially thereon, of a series of auxiliary cards or plates interspersed between said picture-cards and adapted to impart resiliency thereto, and means for rotating said reel, substantially as described.

5. In a mutoscope, the combination, with a reel having a series of picture-cards arranged radially thereon, of a series of auxiliary cards or plates interspersed between said picture-cards and adapted to impart resiliency thereto, a detent for momentarily retarding and bending backward said cards, successively, as the reel moves, and means for rotating said reel, substantially as described.

6. In a mutoscope, the herein-described auxiliary card or plate adapted to impart resiliency to the picture-cards, substantially as described.

In testimony whereof I affix my signature in presence of two witnesses.

HERMAN CASLER.

Witnesses:
GEO. B. RUSSELL,
GRACE H. ROSE.